(12) United States Patent
Adams et al.

(10) Patent No.: US 7,597,728 B1
(45) Date of Patent: Oct. 6, 2009

(54) METHOD AND APPARATUS FOR USING RECYCLED OIL AS FUEL

(75) Inventors: Bill L. Adams, Cahokia, IL (US); Lee M. Cole, Brandon, MS (US); Jeff W. Warnock, Smyrna, GA (US)

(73) Assignee: APAC, Atlanta, GA (US)

( * ) Notice: Subject to any disclaimer, the term of this patent is extended or adjusted under 35 U.S.C. 154(b) by 1173 days.

(21) Appl. No.: 10/151,797

(22) Filed: May 22, 2002

(51) Int. Cl.
*C10L 5/00* (2006.01)

(52) U.S. Cl. .............................. 44/628; 44/629; 44/639; 208/179

(58) Field of Classification Search ................... 44/628, 44/629, 639; 208/179
See application file for complete search history.

(56) References Cited

U.S. PATENT DOCUMENTS

| | | | | |
|---|---|---|---|---|
| 5,527,449 | A | * | 6/1996 | Brown et al. ................. 208/179 |
| RE36,922 | E | * | 10/2000 | Sparks et al. ................ 208/131 |
| 6,132,203 | A | * | 10/2000 | Masin .......................... 431/121 |
| 6,485,632 | B1 | * | 11/2002 | Ward ........................... 208/179 |
| 6,694,928 | B2 | * | 2/2004 | McNeil ....................... 123/1 A |

FOREIGN PATENT DOCUMENTS

| | | | |
|---|---|---|---|
| HU | 9904059 | * | 3/2002 |
| JP | 64000197 | * | 1/1989 |
| JP | 10219261 | * | 8/1998 |

\* cited by examiner

Primary Examiner—Cephia D Toomer
(74) Attorney, Agent, or Firm—Frank J. Kowalski

(57) ABSTRACT

A method for using recycled lubricating oil as a fuel source includes receiving prepared recycled lubricating oil, filtering the recycled lubricating oil through a first filter. The recycled oil is pumped into the top of a first holding tank. The recycled oil is circulated from the bottom of the first holding tank through the first filter to the top of the first tank. The recycled oil is pumped from the bottom of the first holding tank through the first filter to the top of a second holding tank. The recycled oil may then be pumped or pulled through a second filter to a preheater to lower the viscosity of the recycled oil to a predetermined level. From the pre-heater the heated recycled oil may be fed to a burner for heat generation or may be fed back to a storage tank. The apparatus for using recycled lubricating oil as fuel includes a storage system having one or more holding tanks along with a filtration system having a first filter for initial contaminant removal. A pre-heater is also included to lower the viscosity of the recycled oil to make it easier to move. The filtration system may also include a second filter prior to preheating. A pump is included to recirculate the recycled oil to prevent water and sludge settling and to move the recycled oil from tank to tank and to a burner where it may be consumed and turned into heat energy.

9 Claims, 2 Drawing Sheets

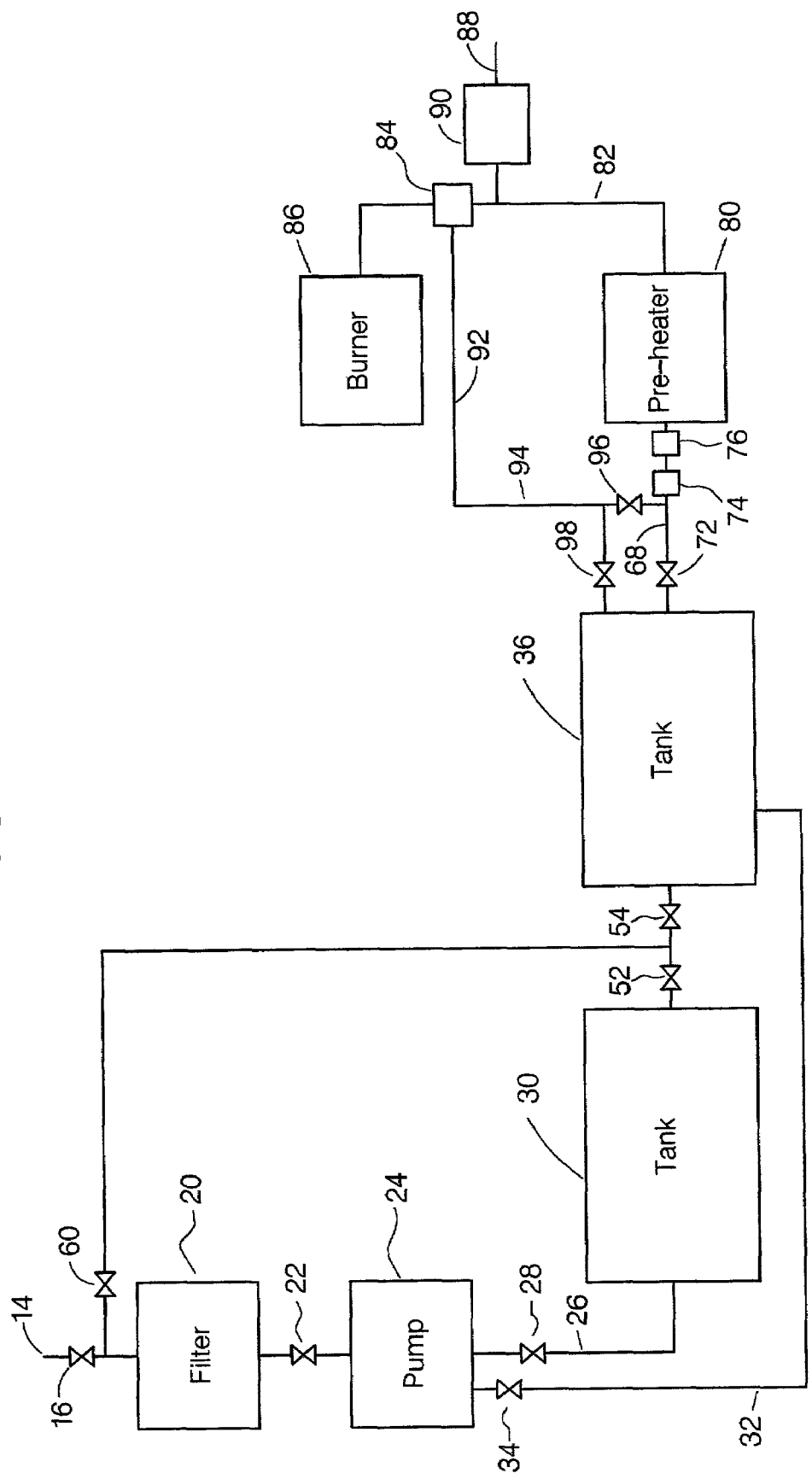

METHOD AND APPARATUS FOR USING RECYCLED OIL AS FUEL

BACKGROUND OF THE INVENTION

1. Field of the Invention

The present invention pertains to the use of recycled lubricating oil and more particularly to the use of recycled lubricating oil as a fuel and a source of heat for processes requiring thermal generation.

2. Related Art

Recycled Fuel Oil is a by-product of used motor oil obtained primarily from the crankcases of internal combustion engines. It is disposed of when it is time to change the oil in any specific internal combustion engine. The used motor oil then becomes a waste stream for which proper disposal methods must be followed. The disposal methods must conform to those promulgated according to EPA regulations.

In using recycled oil as a fuel, there are several possible approaches. One approach may be to design the burner around the inconsistent quality of oil while another may be to try to improve the quality of the recycled oil. In the first approach, the inconsistency of recycled oil and its varying quality are recognized in the type of burner designed for its use. Such a burner is described below.

U.S. Pat. No. 5,405,261 titled "Waste Oil Fired Heater with Improved Two-Stage Combustion Chamber" issued to Charles R. Scraggs et al. relates to a burner that was designed for recycled oil with its varying viscosity. A two-stage combustion chamber for burning waste hydrocarbons such as crank case oil, spent motor oil, transmission fluid, lubrication dopes and heavy bodied gear lubes. The combustion chamber is formed from a plurality of spaced apart, stacked annular rings that form a flame containment housing having superheated surfaces. The flame containment housing contains the flame of an atomizing oil burner suitable for burning the variable viscosity waste hydrocarbons. The annular rings include outer walls and inwardly extending flanges that intercept unburned fuel droplets and combustion byproducts, vaporizing the droplets and stimulating secondary combustion. The annular rings are removable and replaceable and are supported in spaced apart relation by spacers on a plurality of support rods. Combustion byproducts and unburned fuel droplets are deflected by the flanges of the annular rings and vaporized or subjected to secondary combustion, thereby minimizing condensation on the relatively cool surfaces of a heat exchanger positioned close to the combustion chamber. The combustion chamber is thus useful in a heat transfer apparatus for heating water or air with waste hydrocarbons.

The second approach to using recycled oil as a fuel, improving the quality of the oil, is to precondition the recycled oil to approximate the quality of number two fuel oil. This approach attempts to remove contaminants either through a mechanical means or a chemical means.

U.S. Pat. No. 5,855,768 titled "Process for Removing Contaminants from Thermally Cracked Waste Oils", issued to Maria Stanciulescu et al. relates to a chemical method of removing contaminants from recycled oil. The process is one for removing contaminants from thermally cracked waste oil, such as, used motor oil. The cracked waste oil is contacted with a solvent comprising methanol. The thermally cracked waste oil is then separated from the solvent whereby a substantial portion of the contaminants are removed into the solvent. Thereafter, the solvent is separated from the contaminants and recycled.

U.S. Pat. No. 5,885,444 titled "Process for Converting Waste Motor Oil to Diesel Fuel", issued to Robert W. Wansbrough et al. relates to a method for reprocessing waste motor oil in a cracking tower similar to those used to initially process oil when it is first brought up from the ground to produce a diesel fuel. The thermal cracking process uses low temperature cracking temperatures from 625 degrees F. to 726 degrees F. with ambient pressure to generate a column distilled fraction of diesel fuel mixed with light ends, the light ends being fleshed off to produce a high quality #2 diesel fuel. The process further provides for removal from the cracking vessel an additional product stream which, when filtered, is suitable for use as a #3 fuel oil and that can be further blended with a bunker oil to yield a #5 fuel product.

U.S. Pat. No. 5,510,023 titled Oil Recycling Apparatus with a Recirculating Filtration Line", issued to John I. Taylor relates to a mechanical device for conditioning recycled oil. The device has a container with an access lid for inserting the oil to be processed. A heater is provided to insure that the oil will be of a temperature that it will be properly processed. A filter system is included which is mounted on top of the container, A pump moves the oil from the bottom of the container to the bottom of the filter system. Pressure then forces the oil through the filter system to a pipe which moves the oil back to the container for another cycle. Oil is continuously recycled from and back to the container for several hours until the oil is clear. It is then ready for removal and reuse.

In one situation, the use of recycled oil as a fuel requires a specially designed burner to handle the inconsistent quality and viscosity of the recycled oil. In another situation, the reconditioning process of recycled oil to make it acceptable is slow and inefficient. The method and apparatus of the present invention responds to both problems.

SUMMARY OF THE INVENTION

The present invention provides an apparatus and a method for the use of recycled motor oil or other recycled hydrocarbon products. The apparatus includes storage tanks, a filter system for filtering the recycled oil, a pump for recirculating the recycled oil to prevent sludge and water from settling, and a preheater for lowering the viscosity of the recycled oil. The method of the present invention includes four steps, storage, filtering, recirculating and preheating. Upon receipt, the recycled oil is filtered to remove contaminants that may have been missed in reconditioning. The recycled oil is then stored in a plurality of tanks, to assure a continuous supply. During the storage period, the oil is continually recirculated to prevent the settling of water or sludge that may be present in the oil. Prior to burning, the recycled oil is preheated to provide a workable viscosity in the burner components. These steps allow recycled lubricating oil to be used as a viable fuel source.

In this method, the process uses the spent motor lubricating oil in a manner by which the waste product is turned into a useable product. This process not only turns a waste product into a readily useable product, it aids in conservation efforts by eliminating a potential pollutant from the environment.

Recycled motor lubricating oil is received at a facility primarily by truck. Upon receipt, the recycled oil is pulled through a sock filter by a pump. After it is filtered, the recycled lubricating oil is pumped into the top of a storage tank. In practice, two tanks in the system are preferred over a single tank to assure a constant supply and the recycled oil may be pumped into either one.

The pump is also used for circulating the recycled oil. Recycled motor oil also contains small amounts of water and sludge that cannot be filtered out. During circulation, the recycled oil is pulled from the very bottom of the tank, back through the sock filter, and pumped back into the top of the tank, thus keeping the water and sludge suspended.

Preheating the recycled oil is done to facilitate the proper burning of the recycled oil. The recycled lubricating oil must be at a certain viscosity to be safely burned to provide heat energy.

As can be seen by the above description, there are four steps to the method or process of the present invention. Those factors are filtration, circulation, preheating and storage. This system allows a facility that uses a heat source in production to utilize a waste product, at a cheaper price. As a result, a significant cost saving is realized.

DESCRIPTION OF THE DRAWINGS

FIG. 2 is a block diagram of the system for using recycled oil as a fuel illustrated FIG. 1.

DESCRIPTION OF THE PREFERRED EMBODIMENT

Figure 1:
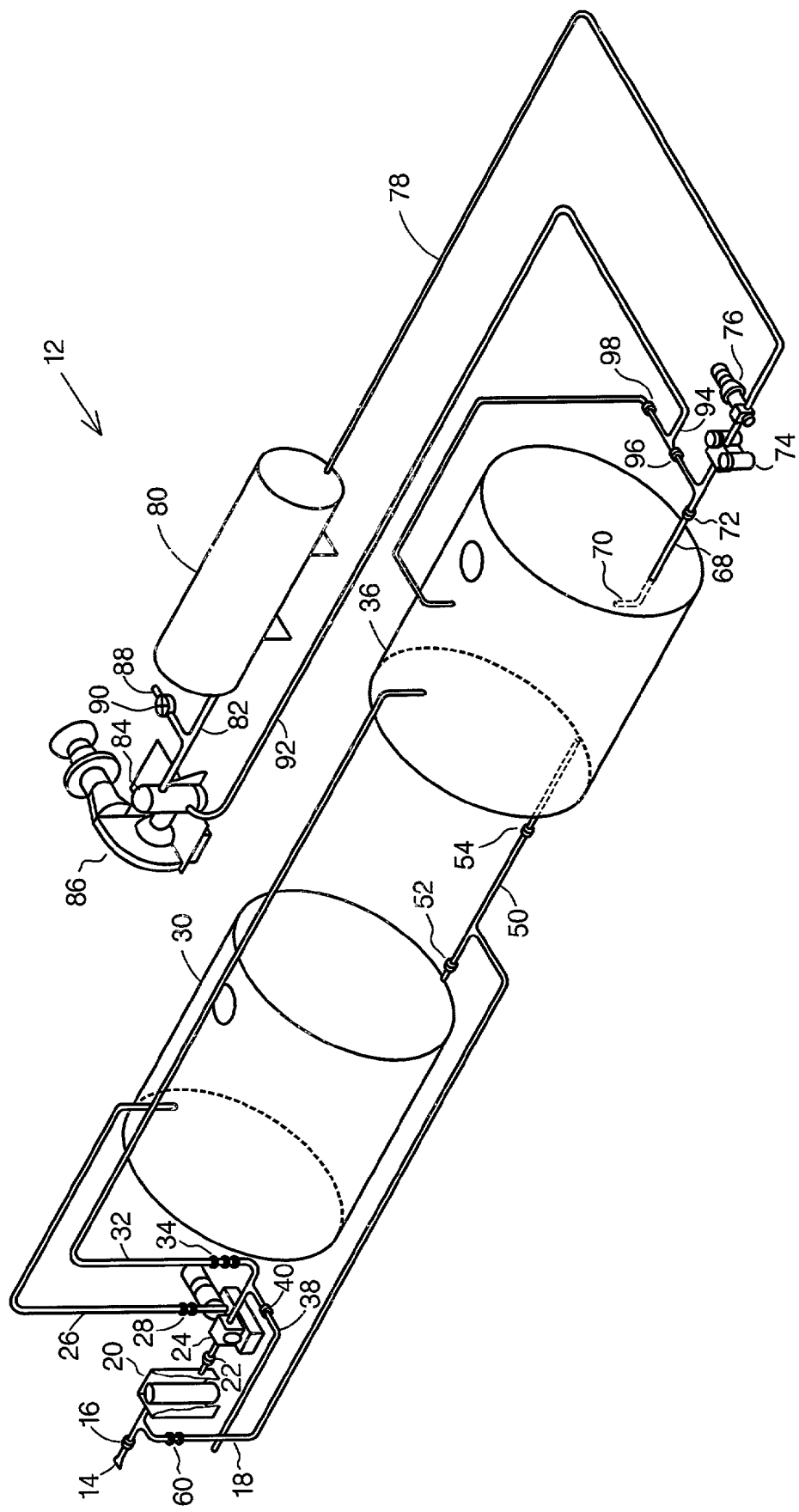
FIG. 1 is a block diagram of a system for using recycled oil as a fuel source.

The present invention provides an apparatus and a method of disposal of used motor lubricating oil which is termed energy recovery. In the method of the present invention, the spent or used motor oil is used in a manner by which a waste product is used as a valuable source of energy to help conserve natural resources and protect the environment from additional pollution. This process aids in the efforts to protect the environment by eliminating a potential pollutant from the stock of waste materials.

Recycled motor lubricating oil, that is motor lubricating oil that has been reconditioned, is received at a facility primarily by truck (not shown). The recycled motor oil is a combination of various lubricating oils used in internal combustion engines. The content of raw recycled motor oil can vary from relatively clean oil, automobile crankcase oil that is changed every three thousand miles, to oil extremely dirty and old oil, such as that which has been in a riding mower for five years. Its viscosity can vary from single grade, such as 30 weight to a multi-grade such as 10W-40, 5W-30, etc. and any grade that motor is sold.

Referring now to FIG. 1, an isometric view of a fuel preparation system 12 for receiving recycled oil from a standard oil delivery truck and providing it to a burner system is shown. Fuel preparation system 12 is illustrated as having intake line 14 with a control valve 16 and a T connection to line 18 and continuing to filter 20. The output of filter 20 feeds through line 22 to pump 24. Upon receipt, the recycled oil is pulled through filter 20 by pump 24, which in the preferred embodiment, is a four hundred Micron sock filter. In the preferred embodiment, filter 20 is before pump 24, however, filter may also be placed after filter 20. Any type of commercial filter may be used, however, a four hundred micron filter is chosen to remove any contaminants which could clog the nozzles that were not removed in reconditioning process.

In most oil reconditioning recycling plants, the mesh of the filters used will be greater than four hundred microns unless specified by the customer. However, even when specified, there is a chance that there may be a shipping error and filtering with larger than four hundred microns may have been done. Thus, the purpose of initially pulling the received recycled oil through a filter is to ensure the quality of recycled oil that is entering the system.

The output of pump 24 goes to line 26 through valve 28 to tank 30, to line 32 through valve 34 to tank 36 and to line 38 through valve 40. Tanks 30 and 36 are connected to each other through line 50, which has valves 52 and 54 controlling the flow from tanks 30 and 36 respectively. Line 50 has a T connection to line 18 which feeds back to filter 20 through valve 60 and back to pump 24. In practicing the present invention, a one tank system is sufficient, however, a multi tank system having more that two tanks is desirable. Multiple tanks provide additional storage for the recycled oil to guarantee that a fuel supply will always be present.

Tank 36 has a supply line 68 with intake 70 feeding through valve 72 through filter 74 to burner supply pump 76. Line 78 connects pump 76 to preheater 80. Line 82 connects preheater 80 to relief valve 84 of burner 86. Line 82 also has a T connection to test port 88 through valve 90. Relief valve 84 is connected to line 92 which joins to line 94. Line 94 connects to line 68 through valve 96 and to the top of tank 36 through valve 98.

Through the use of the present invention, burner 86 may be of any type presently being used commercially with #2 fuel oil or a dual type burner which can be used with #2 fuel oil or gas. This means that the burner can be one which has a standard spray nozzle that almost vaporizes the fuel by producing a fine mist. This mist is easily ignited by electric arc or other method to produce combustion. Standard spray nozzles may be used since the recycled oil is further conditioned by the present invention to provide a low viscosity workable oil.

In operation, recycled lubricating oil is received at a commercial facility and pulled through a first filter 20 into one of a plurality of storage tanks. In FIG. 1, the recycled oil is initially pumped into tank 30, however, if desired, by closing valve 28 and opening valve 34, the recycled oil can be pumped into tank 36 from filter 20. Tanks 30 and 36 are provided with recirculating pipes or line 50 connecting to line 18 so that the recycled oil may be continually recirculated to keep contaminants, such as water, in suspension. This prevents these contaminants from settling and forming a large concentration that can shut down burner 86.

Tank 30 or tank 36 may be chosen for recirculation by opening or closing valves 52 and 54. If tank 30 is to be recirculated, valve 52 is opened and valve 54 is closed. Valve 60 is opened and valve 28 is opened while valve 34 is closed to recirculate tank 30.

If tank 36 is to be recirculated, valve 52 is closed and valve 54 is opened. To recirculate tank 36, valve 34 is opened while valve 28 is closed while valve 60 is opened.

For recirculation, the oil is pulled by pump 24 through the same first filter, filter 20, to filter the recycled oil again. Tanks 30 and 36 are also arranged so that recycled oil may be transferred from one tank to another.

By closing valve 54 and opening valve 52 for obtaining oil from tank 30, and by opening valve 60 and 34 while keeping valve 28 closed, the recycled oil from tank 30 may be transferred to tank 36. Likewise, by closing valve 52 and opening valve 54, while opening valve 60 and 28 and closing valve 34, recycled oil may be transferred from tank 36 to tank 30.

The tanks are configured to provide a fuel supply to burner 86 through preheater 80. Preheater 80 is used to reduce the viscosity of the recycled oil. The recycled oil has, in general, been used as a lubricating oil in an internal combustion engine. As such, its viscosity is of a nature to lubricate and does not have the free flowing viscosity of number two fuel oil or diesel fuel.

Additional filter 74 is provided to filter the recycled oil a final time before transferring it to preheater 80. In the preferred embodiment this filter is a number forty (#40) mesh duplex strainer. However, any filter may be used to assure that the recycled oil does not contain any contaminants that may plug or foul the nozzles of burner 86.

In general, while recycled lubricating oil is filtered during reprocessing, the filtering process in the recycling plant does not produce a product of sufficient quality for use as a commercial fuel. In light of this, appropriate measures must be taken to protect equipment against contaminants which may be contained in the recycled motor oil. Small contaminants are present which are not destructive for non commercial burning of recycled motor oil. However, small contaminants present in the recycled oil can clog fuel spray nozzles and cause breakdowns in burners.

The filtering system operates more of an insurance system and will eliminate most foreign particles in the oil, that have either been missed at the recycling plant of picked up in the delivery truck, before the particles can get into the system. Before recycled oil is ordered, the reconditioning plat is given instructions as to the size of filter to be used on the oil. Sometimes the reconditioning plant does not use the prescribed filter on all recycled oil and particles larger than desired can be in the recycled oil, through a mix up in the batch or a similar occurrence. In addition, the truck delivering the oil may have been used to pick up spent oil at some facility for delivery to the reconditioning plant immediately prior to delivering the reconditioned oil. If the truck was not properly cleaned, there may be some residual contaminants left in the truck. If recycled oil without the proper filtration is allowed into the system, it could result in down time and major profit loss due to contaminant clogging. As a result, initial filtration for most recycled oil, such as that done through sock filter 20, is extremely important.

In the system of the present invention, all transfer lines, piping and hoses are preferably a three inch diameter. This is because most delivery trucks for transporting recycled oil are equipped with three inch piping which gives the optimum flow. The recycled oil is pumped into the top of whichever tank is desired by opening the valve to that tank only. As stated previously, two tanks in the system are preferred, however, a one tank system is sufficient while a multi tank system having more that two tanks, is desirable.

The intake valve for receiving fuel from the delivery truck in the preferred embodiment of the present invention is a three inch unidirectional ball check valve. This valve is easily operated and has a check clapper to prevent fluid flow in the opposite direction. Thus, when recycled oil is being unloaded, there can be no back flow. The remainder of the valves in the system can be standard ball valves which permit bidirectional flow.

Pump 24 is preferably a four inch Roper pump which is also used for circulating the recycled oil. Although three inch pipes are used throughout the system, a four inch pump that is slowed down is used to provide additional life for the pump since it is used so extensively in the system of the present invention. As indicated above, recycled motor oil also contains small amounts of water and sludge. Water is heavier than oil, and if the recycled oil is allowed to sit long enough, the water and sludge will drop to the bottom of the tank. This will build up over time and reduce the amount of oil in the tank.

If water and sludge is allowed to build up in the bottom of a tank it will eventually reach the draw lines that supply the recycled oil to the burner. As a result, the burner will shut down and the entire system and the commercial facility where it s used will be out of operation until the water and sludge is removed from the system. This is very costly and time consuming.

Proper circulation is necessary to prevent build up of water and sludge in the bottom of tanks 30 and 36. If the small amounts of water and sludge are kept suspended throughout the tank by continuous circulation, no problems should occur. In the present invention, each tank can be circulated, but it is recommended that only one tank should be circulated at a time. This is done in order to keep from overfilling a tank.

During circulation, the recycled oil is pulled from the very bottom of tank 30 or 36, back through filter 20, and back into the top of tank 30 or 36, whichever tank is being recirculated, thus keeping the water and sludge suspended.

Pump 20 is also used for transferring between tanks 30 and 36. The recycled oil is pulled from the bottom of one tank either tank 30 or tank 36, back through filter 20, and into the top of the other tank, either tank 36 or tank 30.

Preheating the recycled oil is done to facilitate the proper burning of the recycled oil. The recycled lubricating oil must be at a certain viscosity to be safely burned to provide heat energy such as at a hot mix asphalt plant. The preferred viscosity is between eighty and ninety SSU's which corresponds generally to a preheated temperature of between one hundred fifty and one hundred eighty degrees Fahrenheit. However, depending on the oil, preheating may be done to a lower temperature, such as one hundred ten degrees. The viscosity will vary with respect to ambient temperature and to the unpredictability of the weight of the oil.

Using recycled motor oil as fuel at the wrong viscosity can be very dangerous due to the build up of extreme liquid pressure in the system. Using oil at a higher viscosity can plug up the spray nozzle on the burner and build pressure in the fuel lines. Because of the pressure in the system, leaks in the system can result along with dangerous pressure build ups at the valves. In addition, facilities that use an anti-pollution filter system to prevent particles from polluting the air can have a dangerous fire hazard if too high of a viscosity is used. The higher viscosity will result in incomplete burning of the fuel. The unburned fuel droplets will be trapped in the air filter and when exposed to the hot exhaust gas, will ignite causing a fire in the anti-pollution filter system.

As can be seen by the above description, there are four steps to the method or process of the present invention. Those steps are filtration, to insure quality, circulation, to prevent settling, preheating, to control viscosity, and storage, to assure a continuous supply. The system of the present invention allows any facility that uses a heat source for product manufacture or for any reason, to utilize a waste product as a hydrocarbon fuel source. Since this fuel source is being recycled and may be obtained at a cheaper price, a significant cost saving is realized.

While there has been illustrated and described a particular embodiment of the present invention, it will be appreciated that numerous changes and modifications will occur to those skilled in the art, and the present invention should not be limited thereto. It is intended that the present invention cover all those changes and modifications which fall within the true spirit and scope of the appended claims.

What is claimed is:

1. A method for using recycled oil as a fuel source comprising:
   receiving recycled oil;
   filtering said recycled oil through a first filter;
   pumping said recycled oil into the top of a first holding tank;
   circulating said recycled oil from the bottom of said first holding tank through said first filter to the top of said first tank;

pulling said recycled oil through a second filter to a preheater;

preheating said recycled oil to lower the viscosity of said filtered recycled oil to a predetermined level; and feeding said preheated recycled oil to a burner for generating heat.

2. The method according to claim 1 wherein said filtering step includes:

running said recycled oil through a first filter comprising a number 400 micron sock filter.

3. The method according to claim 1 wherein said pulling said recycled oil includes:

pulling said recycled oil through a second filter comprising a number 40 mesh duplex strainer.

4. The method according to claim 1 wherein said preheating said recycled oil includes:

heating said recycled oil to a temperature producing a viscosity between eighty and ninety SSU's.

5. The method according to claim 1 also including:

pumping said recycled oil from the bottom of said first holding tank through said first filter to the top of a second holding tank.

6. The method according to claim 5 wherein said filtering step includes:

running said recycled oil through a first filter comprising a number 400 micron sock filter.

7. The method according to claim 5 wherein said pulling said recycled oil includes:

pulling said recycled oil through a second filter comprising a number 40 mesh duplex strainer.

8. The method according to claim 5 wherein said preheating said recycled oil includes:

heating said recycled oil to a temperature to provide a viscosity between eighty SSU's and ninety SSU's.

9. A method for using recycled engine lubricating oil as a fuel comprising:

receiving the recycled oil at a storage tank;

pulling said recycled oil through a filter and pumping it into the top of said storage tank;

taking said recycled oil from the bottom of said storage tank and recirculating said recycled oil to said top of said storage tank;

pulling said recycled oil from said bottom of said storage tank and supplying said recycled oil to a preheater;

preheating said recycled oil to provide a workable viscosity; and providing said preheated oil to an oil burner.

* * * * *